United States Patent [19]
Maruyama et al.

[11] Patent Number: 5,526,519
[45] Date of Patent: Jun. 11, 1996

[54] MEMORY MANAGEMENT TECHNIQUE FOR EFFICIENT EXECUTION OF PROCEDURES IN OBJECTS

[75] Inventors: Takeo Maruyama, Osaka; Yoichi Yamamoto, Kawasaki; Kazuhiro Satoh, Ebina, all of Japan

[73] Assignee: Hitachi, Ltd., Tokyo, Japan

[21] Appl. No.: 38,634

[22] Filed: Mar. 29, 1993

[30] Foreign Application Priority Data

Mar. 27, 1992 [JP] Japan .................................. 4-070600

[51] Int. Cl.⁶ ........................................ G06F 9/445
[52] U.S. Cl. ........................ 395/600; 364/DIG. 1; 364/281.1
[58] Field of Search ............................ 395/600, 425

[56] References Cited

U.S. PATENT DOCUMENTS

| | | | |
|---|---|---|---|
| 4,277,826 | 7/1981 | Collins | 395/425 |
| 4,422,145 | 12/1983 | Sacco et al. | 395/425 |
| 4,718,008 | 1/1988 | Chang et al. | 395/425 |
| 4,758,944 | 7/1988 | Bartley et al. | 395/425 |
| 4,989,134 | 1/1991 | Shaw | 395/425 |
| 5,136,706 | 8/1994 | Courts | 395/600 |

FOREIGN PATENT DOCUMENTS

| | | |
|---|---|---|
| 57-30044 | 2/1982 | Japan . |
| WO90/04829 | 5/1990 | WIPO . |

OTHER PUBLICATIONS

Yuasa, "Realtime Garbage Collection in General Purpose Computers", Science, Sep. 1988 pp. 56–71.

Unger, D, "Generation Scavenging: A Non–Disruptive High Performance Storage Reclamation Algorithm", ACM Sym. on Soft. Envir. 1984, pp. 157–167.

Date, C. J., "An Introduction to Database Systems 4th Edition", 1986 pp. 47–58.

"Guide to Operating System", Nihon Noritsu Association pp. 212–217.

"Pointer Swizzling at Page Fault Time: Efficiently Supporting Huge Address Spaces on Standard Hardware", P. Wilson, Software Systems Lab., Technical Report, Dec. 1990, pp. 6–13.

"Store Management in IBM APL Systems", R. Trimble, IBM Systems Journal, 1991, vol. 30, No. 4, pp. 456–468.

"Real Time Garbage Collection in General Purpose Computers", pp. 57–59, 62–71.

Primary Examiner—Thomas G. Black
Assistant Examiner—John C. Loomis
Attorney, Agent, or Firm—Antonelli, Terry, Stout & Kraus

[57] ABSTRACT

An object-oriented system which deals with data and procedure integrally includes a memory having a real memory space which contains a set of object management information, a set of page management information, a fixed page region and an unfixed page region, a memory management section for managing these parts, a swap file for saving pages, and a method execution section which executes the procedure of an object. When loading the object into the real memory space, address-unfixed pages in the unfixed page region are allotted to the object and address-fixed pages in the fixed page region are allotted to the object at the time of execution. Consequently, the object can be accessed directly based on the physical address. The garbage collection and page swapping processes are implemented only for address-unfixed pages, and the overhead of object access operation can be reduced.

1 Claim, 10 Drawing Sheets

FIG. 1
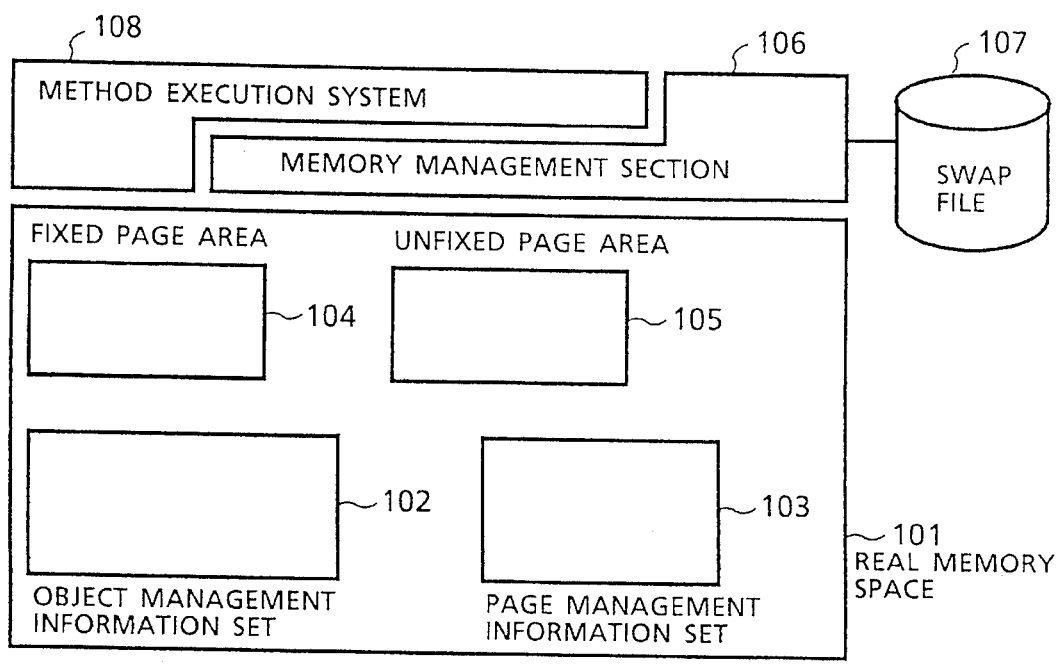
FIG. 2
OBJECT MANAGEMENT INFORMATION (OMI)
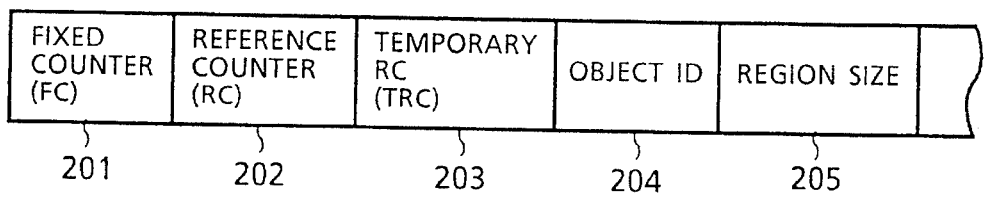
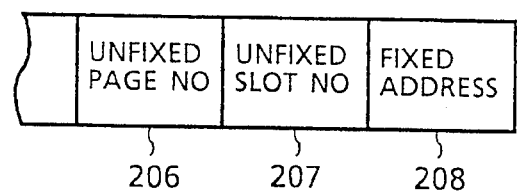

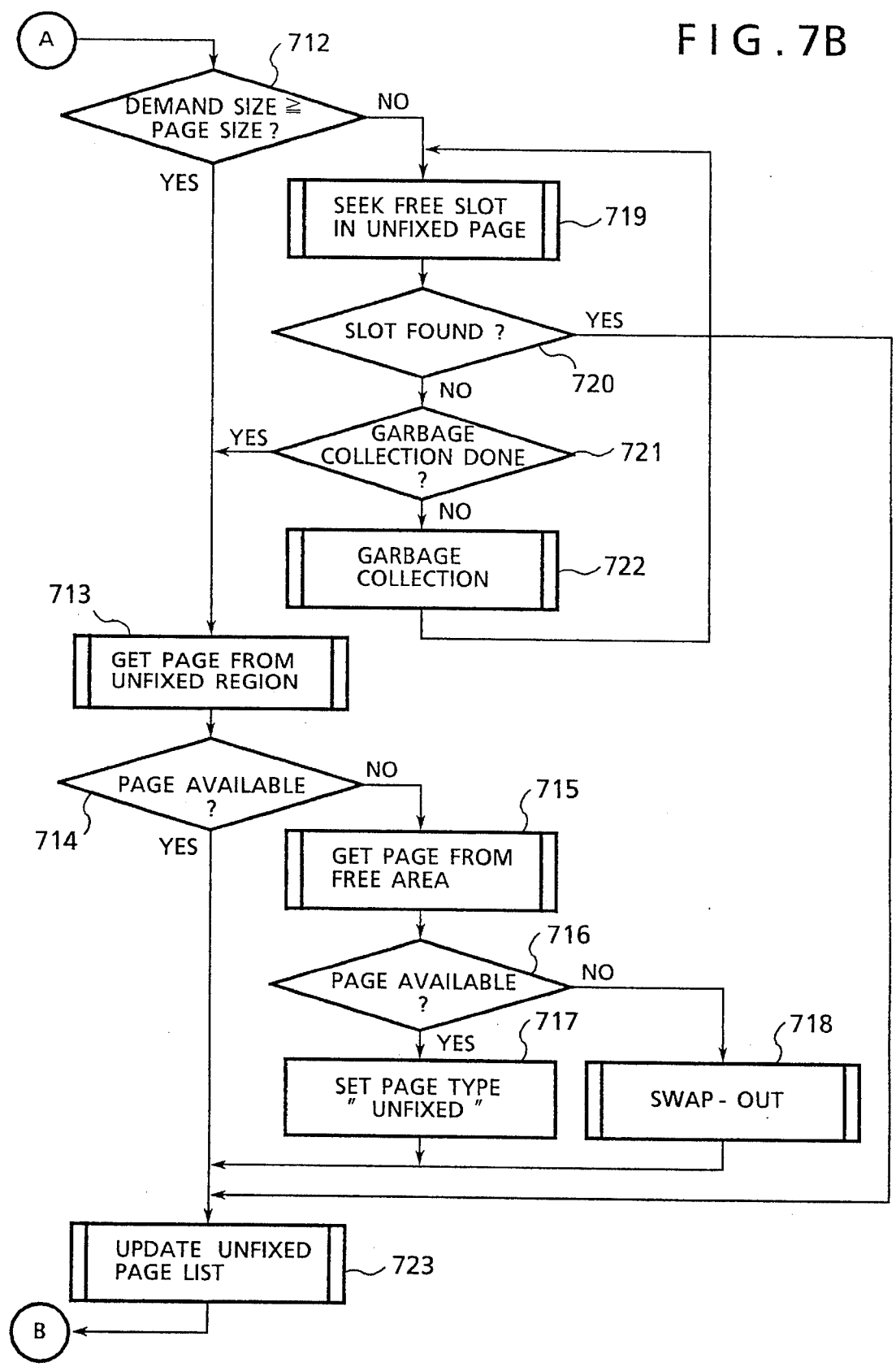

MEMORY MANAGEMENT TECHNIQUE FOR EFFICIENT EXECUTION OF PROCEDURES IN OBJECTS

BACKGROUND OF THE INVENTION

This invention relates to an object management system dealing with objects in which data and procedure are capsulized, and particularly to an object management system which is intended to speed up the allocation and access of objects in consideration of the manner of object storing and management of the real memory space.

The object-oriented management system in which data and procedure are integrated as capsulized objects has been introduced in recent computer technology. Particularly, for object-oriented database systems in which objects are used continually and permanently, it is indispensable to have an object management function.

An object includes data of arbitrary length and a procedure of arbitrary length, and therefore the object management needs to have a function of managing memory areas of variable size. When the entire memory space has been used as resources through the sequential allotment, it becomes necessary to collect unused areas to thereby provide a memory area as another resource. This operation is called "garbage collection".

Among methods of garbage collection, the Mark & Sweep method marks active objects and collect unused areas by sweeping in the entire memory space. The Copy method divides the memory space into two regions and copy active objects to one region. The Generation-Scavenging method, which is a derivative of the Copy method, collects information having a long expected life into the same region so that it is excluded from the garbage collection process. A conventional garbage collection technique based on the Mark & Sweep method is described in an article entitled "Real-time garbage collection in a general-purpose computer" of publication Science, pp. 56–71, published in September 1988 by Nikkei Science Corp. Another conventional garbage collection technique based on the Generation-Scavenging method is described in an article entitled "Generation scavenging: A non-disruptive high performance storage reclamation algorithm" written by Unger, D., in the ACM Symposium on practical software environments", pp. 157–167.

However, if the number of active objects increases, areas used for these objects will not be available through the garbage collection process, resulting in a system down. In this case, some areas are saved to a secondary storage temporarily The area management including the secondary storage is realized in the virtual memory management technique of operating systems, and the paging method is the one frequently used in recent years. In this method, the memory space is divided into pages, and when the remaining area becomes insufficient, the contents of a page area is moved to a file. This file is called "Swap file", and the transfer to and from the swap file is called "Swap in" and "Swap out". The LRU (least recently used) method is used frequently for selecting a page to be swapped out. This method is to swap out a page which has not been accessed for the longest time. The paging method is described in the publication entitled "Introduction to operating system", pp. 212–217, published by Nihon Noritsu Kyokai.

A relational database is a typical database system capable of dealing with a group of data in the form of a table, with each column of the table being treated as a record. The paging method is used for the memory management of the relational database, and each page contains a group of records (subset of table). A record is converted into a form of a page and is then accessed. A new page is made available by swapping out an unused page based on the above-mentioned LRU method. The pagewise storing technique of the relational database is described in the publication entitled "An introduction to database systems" (4th edition), pp. 47–58 written by C. J. Date and A. Wesley in 1986.

The foregoing conventional techniques do not involve the concept of precluding objects, which are used during the execution of procedures, from the garbage collection and page swap processes. In the conventional techniques, an object is accessed based on the logical address of the virtual memory system and information resulting from the mapping of the logical address to the physical address of the real memory and to the access information for the secondary storage. Although this access method is advantageous in carrying out the garbage collection and page swap processes of the real memory space by merely changing the mapping information instead of changing the logical address, the system halts during the period when the mapping information is changed. Particularly, an object executing procedure needs to fetch and execute commands cyclically, and the implementation of garbage collection and page swapping results adversely in a degraded throughput of the procedure execution of the object.

SUMMARY OF THE INVENTION

An object of this invention is to provide an object management system capable of improving the throughput of the procedure execution of objects.

Another object of this invention is to provide an object management system capable of executing objects smoothly even during of the garbage collection or page swap processes which take place for the efficient use of the resources for the objects.

The above objectives are achieved by the object management system comprising a memory for storing objects in which data of variable length and procedure are capsulized, an execution section which fetches an object from the memory and executes the procedure, and a memory management section which collects unused memory areas when the memory space becomes insufficient, wherein the memory space is divided into a fixed-address region and an unfixed-address region, and when the execution section executes the procedure of an object, the object is moved and placed in the fixed-address region and, upon completion of the execution, the object is moved to the unfixed-address region and the real address is freed.

The above objectives are achieved by precluding the fixed-address region from the garbage collection and page swap processes which are carried out when the real memory space becomes full.

Since address-fixed objects are precluded from the garbage collection and page swap processes, these processes can be executed without affecting the object which is being accessed. Since an object is placed in the real address region at the time of execution, it is possible to access the address-fixed object during the garbage collection process directly without the intervention of memory management, and consequently the object can have an enhanced throughput of procedure execution.

BRIEF DESCRIPTION OF THE DRAWINGS

FIG. 1 is a block diagram of the object management system based on an embodiment of this invention;

FIG. 2 is a diagram showing the structure of the object management information;

FIGS. 7A and 7B are a flowchart showing the memory allotment request process;

DESCRIPTION OF THE PREFERRED EMBODIMENTS

Figure 3:
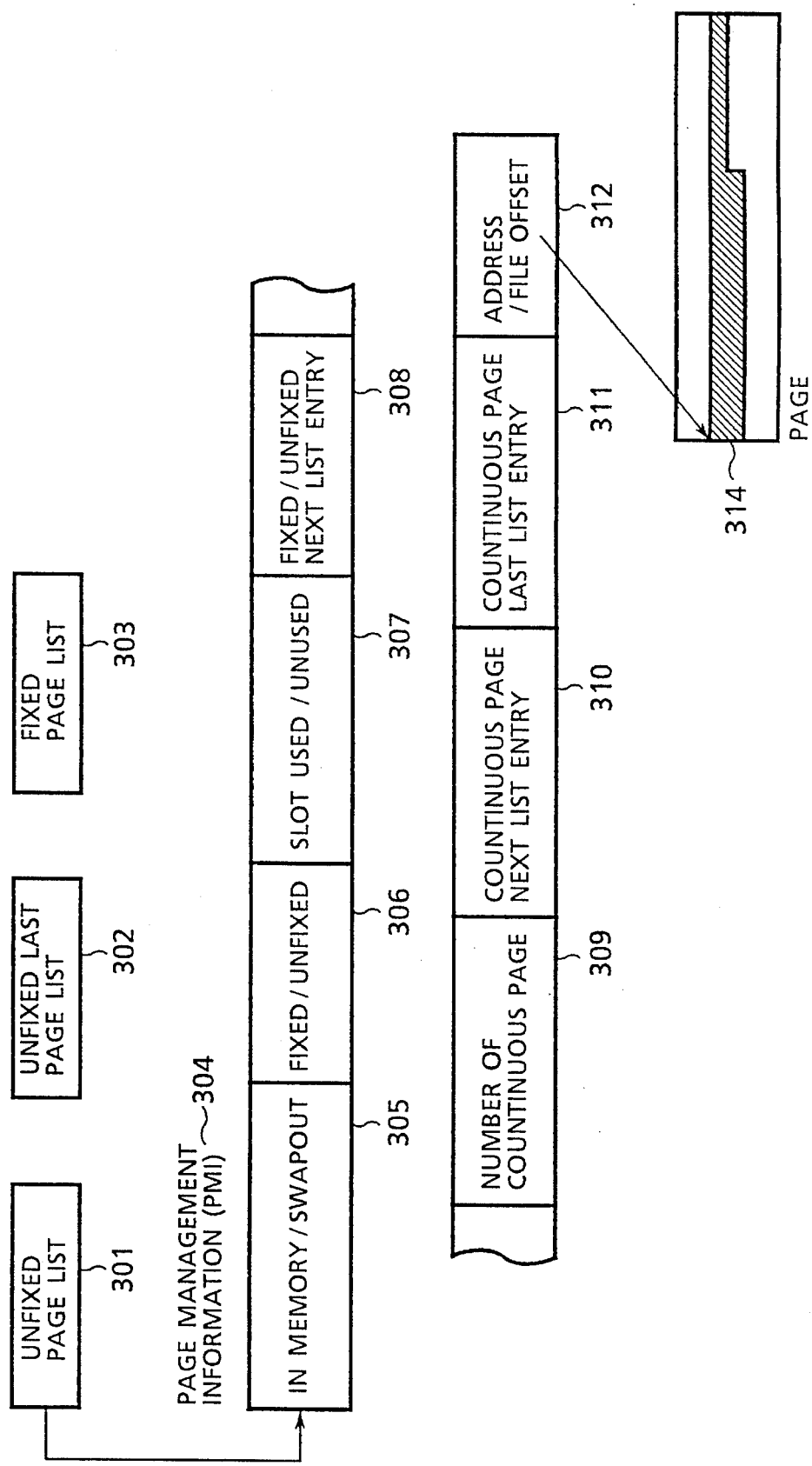
FIG. 3 is a diagram showing the structure of the page management information.

An embodiment of this invention will be described with reference to FIG. 1 through FIG. 10.

FIG. 1 is a block diagram showing the object management system based on an embodiment of this invention. Reference numeral 101 denotes a real memory space storing objects, object management information and the like, 102 is a set of object management information, 103 is a set of page management information used for the page-wise management of the real memory space, 104 is a fixed page area including pages (fixed pages) containing address-fixed objects, 105 is an unfixed page area including pages (unfixed pages) containing address-unfixed object,. 106 is a memory management section which manages the areas 102–105 of the real memory space 101, 107 is a swap file used to save the contents of the address-unfixed page area 105 of the real memory space 101 when necessary, and 108 is a method execution system which executes the procedure of the objects which reside in the real memory space 101 under control of the memory management section 106 and issues an address fix request to the memory management section 106 at the time of execution. Fixing of the address for the object will be explained later.

The object management system of this invention performs the object management by dividing an object into object management information (OMI) of fixed size and data of procedure of variable size in the real memory space (region). The object management information is included in the set of object management information 102 and the procedure data region is included in address-fixed pages or address-unfixed pages. The object identifier and object number are used in loading the relevant object management information.

FIG. 2 shows as an example the structure of the object management information. Indicated by 201 is a fixed counter which counts the number of events of address fix request for an object, and count 0 signifies that the object is not yet address-fixed. Fixing of the address is to map the object with the physical address in the real memory space 101. The address fix request arises at each access to the object, and it is issued a plurality of number of times for one object. An address-fixed object is released on completion of the access, and the counter is decremented by one. Indicated by 202 is a reference counter which counts the number of references to the object made by other objects. 203 is a temporary reference counter which counts the number of events of temporary reference in such a case that the object is used as the receiver or parameter of the method. The event of reference takes place for a complex object in which an object A includes another object B, and the object B has its reference counter incremented by one by being referenced by the object A. The event of temporary reference is not a static reference, but it takes place for example when an object C is designated as an argument of procedure, and in this case the object C has its temporary reference counter incremented by one. These counters are decremented by one at the end of reference. The reference counter 202 or temporary reference counter 203 having a non-zero count value indicates that the object is active since it is referenced. In this embodiment, an active object is precluded from garbage collection. Otherwise if both of these counters contain zero, the object is assumed to be waste and it is subjected to garbage collection. Indicated by 204 is the object identifier (ID) for the unique identification of the object in a global sense, 205 is the size of the region, and 206 and 207 are information used for the access to an address-unfixed region and it consists of a page number 206 for specifying a page and a slot number 207 for specifying a slot within the page. 208 is access information for the address-fixed region, and the physical address contained in this information is referenced directly for access.

Figure 4:
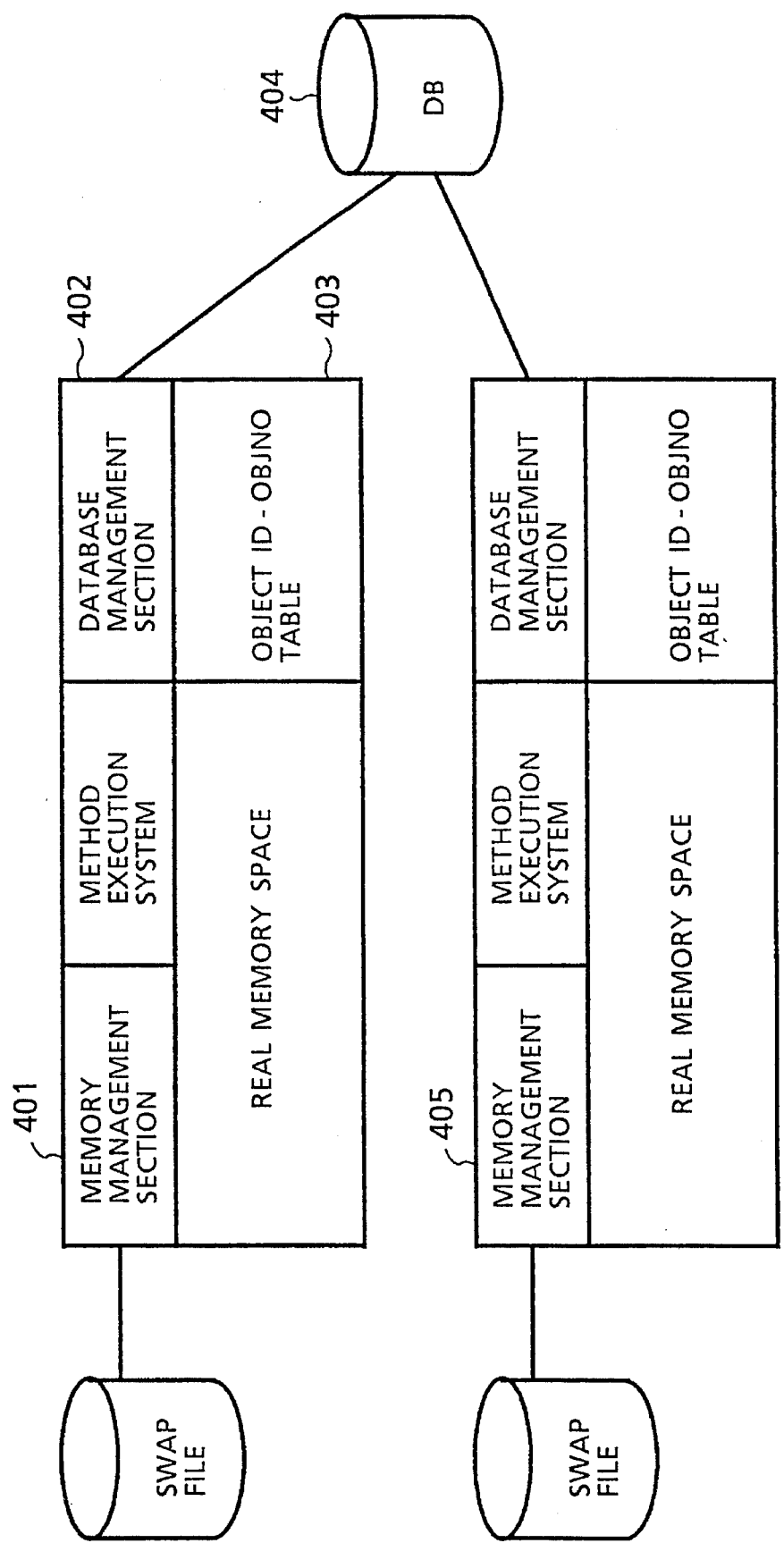
FIG. 4 is a block diagram showing an embodiment of this invention in which a plurality of object management systems share a database.

In case a database is shared by more than one system, the object identifier is used to identify an object uniquely by all systems. The object number is an identifier which is effective only within a system. FIG. 4 shows an example in which two systems share a database. The section 401 enclosed by the bold line is the object management system of this invention. Indicated by 402 is a database management section which transacts objects between the database and real memory space, 403 is a table which converts the object number to the object identifier for loading an intended object based on the object number, 404 is a shared object database, and 405 is another object management system. Objects saved in the database 404 are identified based on the object identifier, and objects loaded into the object management system 401 are treated in terms of the object number.

Next, the page-wise object management will be explained. The memory space is managed by being divided into pages. Pages are categorized into fixed pages, unfixed pages and free pages. Each page has a page number and a page management information.

FIG. 3 shows as an example the structure of the page management information. Indicated by 301 is a pointer which indicates the top entry of the page management information list for all unfixed pages including pages in the swap file, 302 is a pointer which indicates the last entry of the page list specified by the pointer 301, 303 is a pointer which indicates the top of the page management information list of all fixed pages, and 304 is a set of page management information consisting of fields 305 through 312. In the structure of the page management information 305–312, 305 is a flag indicating whether or not the page is saved in the swap file, 306 is an address status flag indicating whether the page is fixed or unfixed, 307 is status flag map for controlling the used or unused state of each slot, 308 is a set of pointers indicating the next entries of the page management information lists 301 and 303, 309 is a field indicating the number of continuous pages, 310 is a pointer pointing the page management information of the next page among the continuous pages, and 311 is a pointer pointing the page management information of the last page among the continuous pages. For consecutive pages, only the management information of the top page is chained to the unfixed and fixed page lists, with page management information of successive pages being shown by the pointers 310 and 311.

For the last of consecutive pages, null is set in the pointer 310. For a single page, "0" is set in the field 309 and "null" is set in the pointers 310 and 311. 312 is a field of information used for page access, and it contains the physical address when the page is loaded in the real memory space 101 or the offset value of the swap file 107 when the page is saved in it. 313 shows the page, and 314 shows the real region. The page management information is arranged in the form table, and the whole information can be accessed by calculating the top address plus page number multiplied by the size of page management information.

When a page is used as an unfixed page, it has page management information (PMI) chained to the unfixed page list 301, with "unfixed" status being set to the flag 306 in the PMI, or when a page is used as a fixed page, it has PMI chained to the fixed page list 303, with "fixed" status being set to the flag 306 in the PMI. Namely, a page is determined to be unfixed or fixed depending on its attribute (type). A set of unfixed pages are defined as the address-unfixed region and a set of fixed pages are defined as the address-fixed region.

In the object management system, when the method execution system executes the procedure of an object, it implements the address fixing process for the object real region, and upon completion of execution, it implements the address freeing (unfixing) process for the object real region.

Figure 5:
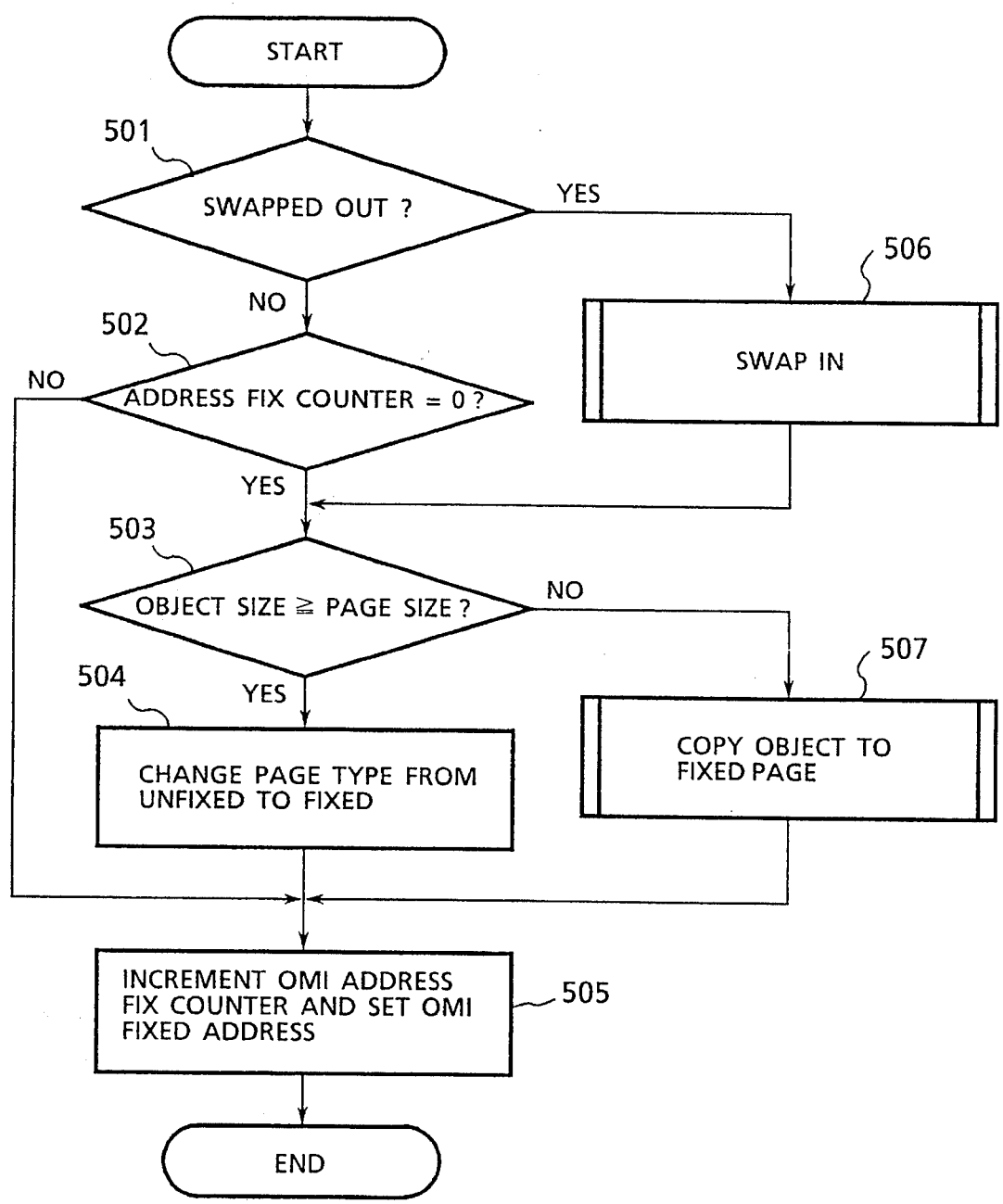
FIG. 5 is a flowchart showing the address fixing process.
Figure 6:
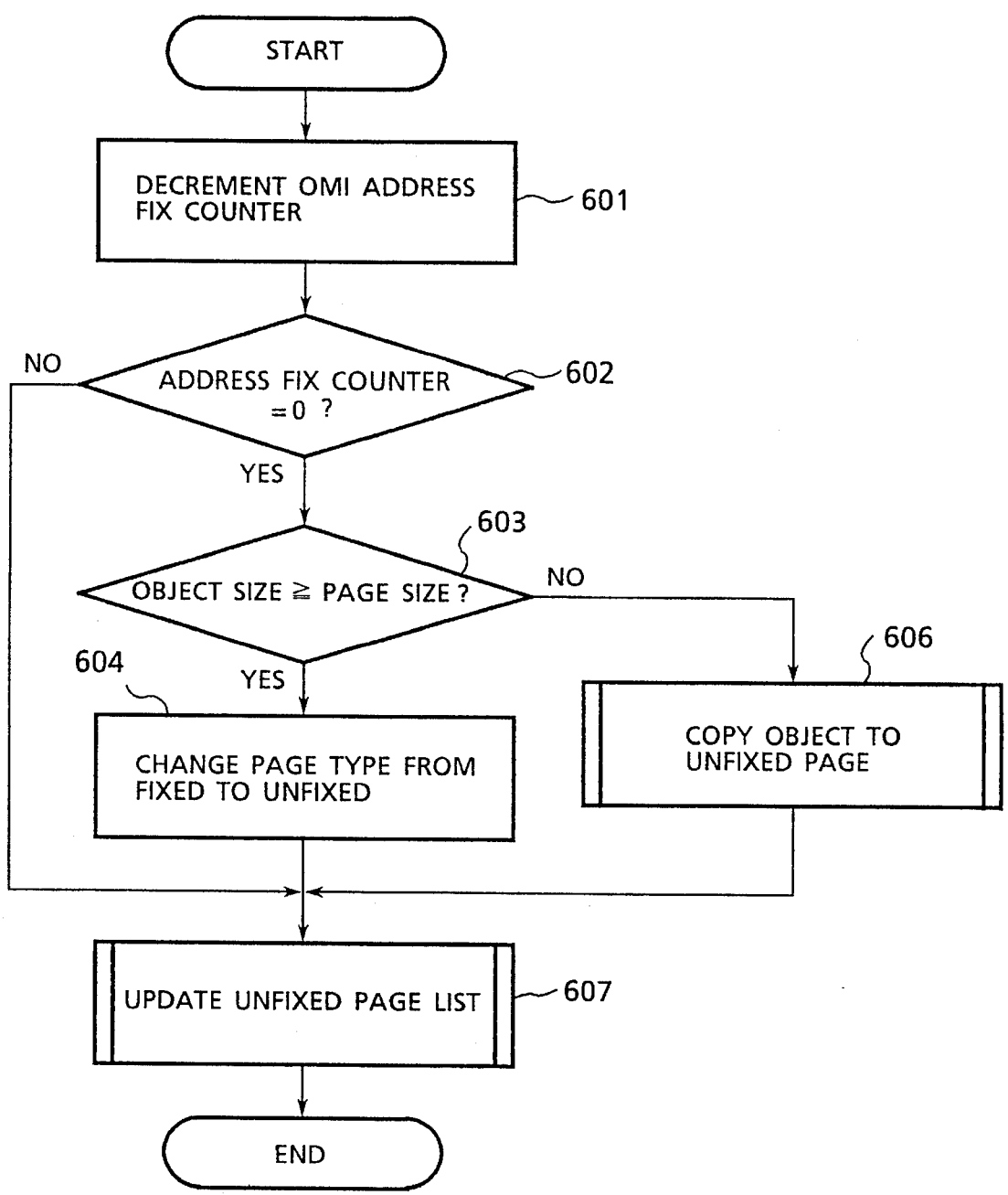
FIG. 6 is a flowchart showing the address freeing process.

FIG. 5 and FIG. 6 are flowcharts showing the address fixing process and address freeing process, respectively, which are implemented for objects that already reside in the memory. In FIG. 5, the memory management section starts the process by using the object number of the object to be executed. Initially, the object number imparted by the method execution system is converted to the object identifier based on the conversion table, and the relevant object management information (OMI) is obtained (step 501). In case the object real region has been swapped out (step 501), the swap-in process is executed (step 506). The value of the fix counter (FC) 201 of the OMI is tested (step 502). If the FC is non-zero, indicative of the address-fixed object as mentioned previously, the process is terminated. If the FC is zero, the real region size 205 of the object is compared with the page size (step 503). If the real region size is greater than or equal to the page size, the page located in the object real region has its type switched from unfixed to fixed (step 504). If the real region size is smaller than the page size, the object real region is copied to free slots of a fixed page (step 507). Finally, the fix counter of the OMI is incremented and the fixed address 208 is set (step 505).

The address freeing process of FIG. 6 is the reversal of the process of FIG. 5. The address fix counter (FC) 201 is decremented (step 601), and when it reaches zero, indicating that all address fix requests are freed, the page type is changed (step 604) or the object is copied to free slots of an unfixed page (step 606) depending on the size of the object real region. Step 607 is a process for chaining the PMI of the accessed page to the head of the unfixed page list, and it is the process for the accomplishment of the LRU-based swapping process. If the object designated by the method execution system is absent in the memory, the method execution system issues a memory request to the memory management section and loads the object from the external storage into the memory area provided by the memory management section.

Figure 7A:
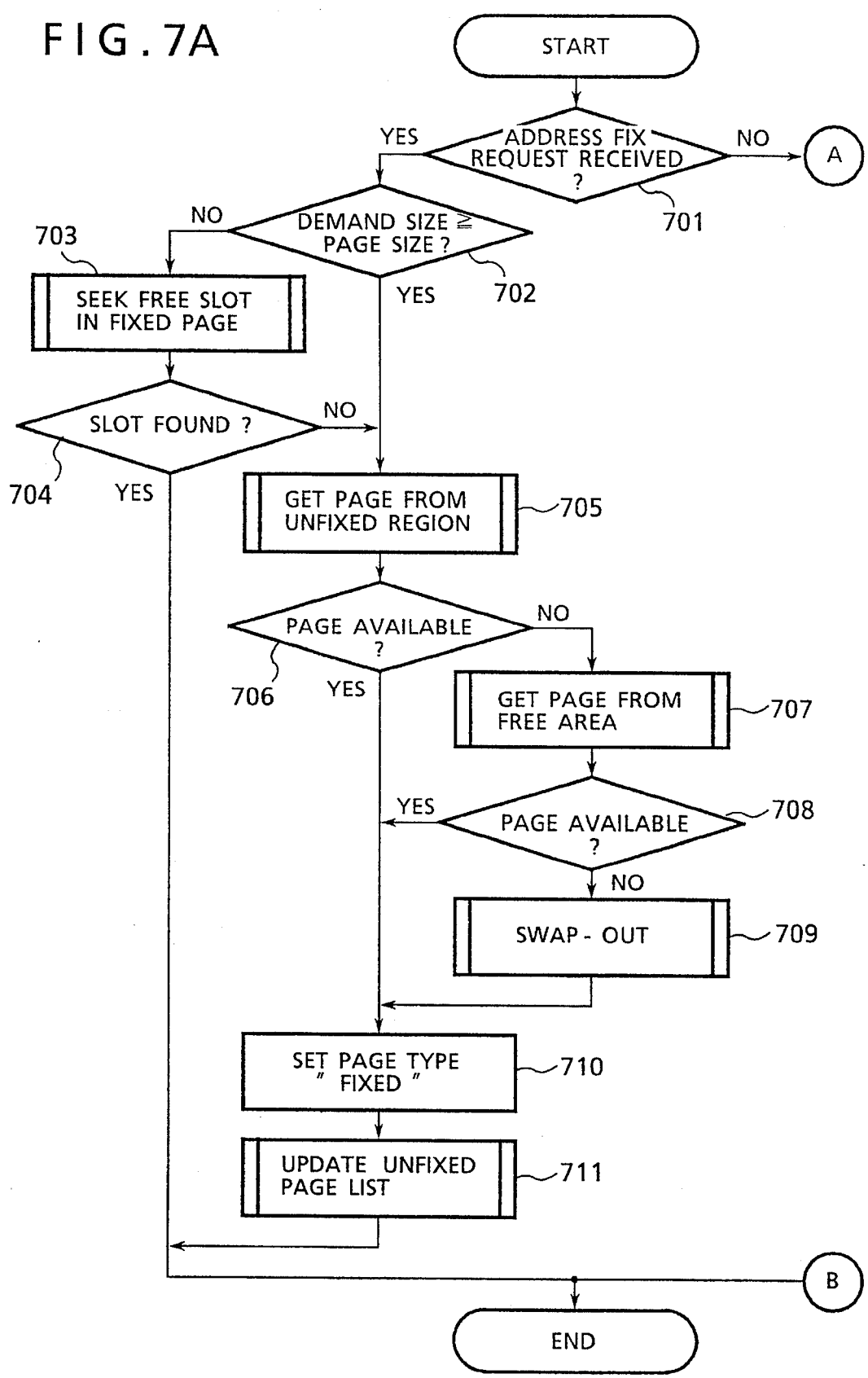

FIGS. 7A and 7B show the algorithm of allocating the object real region to the main memory in response to the memory request. Initially, the method execution system imparts the size and type of allocation as parameters to the memory management section. There are two types of allocation for the address-fixed area and address-unfixed area.

In the case with the address fix request, the system seeks free slots in fixed pages (step 703), or unfixed pages or unused free pages (step 705) depending on the required size (step 702). In the latter case, the system changes their type to "fixed" (steps 705–711), thereby reserving the pages. If the unused pages are not found, the system saves the contents of unfixed pages to the swap file, i.e., swap out, (step 709) so as to reserve the pages.

In the case without the address fix request, the system seeks free slots in unfixed pages (step 719), or unfixed pages or unused free pages (steps 713–723) depending on the required size (step 712), thereby reserving the pages. During the seeking of free slots in unfixed pages, the system implements the garbage collection (step 722), and if unused pages are not found, the system implements the swap-out process (step 718). Steps 711 and 723 are maintenance operations for the page list for the accomplishment of the LRU method.

Figure 8:
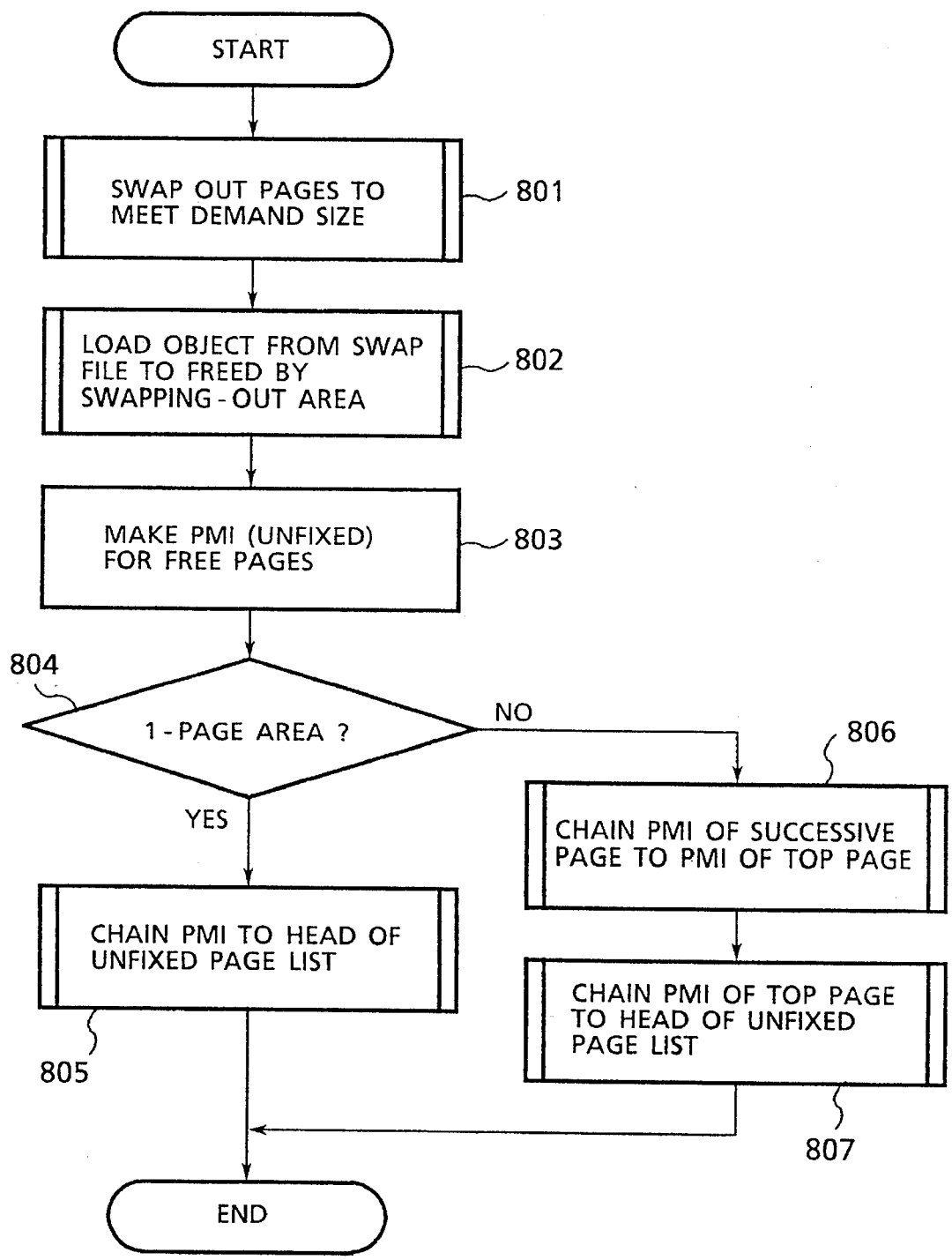
FIG. 8 is a flowchart showing the swap-in process.
Figure 9:
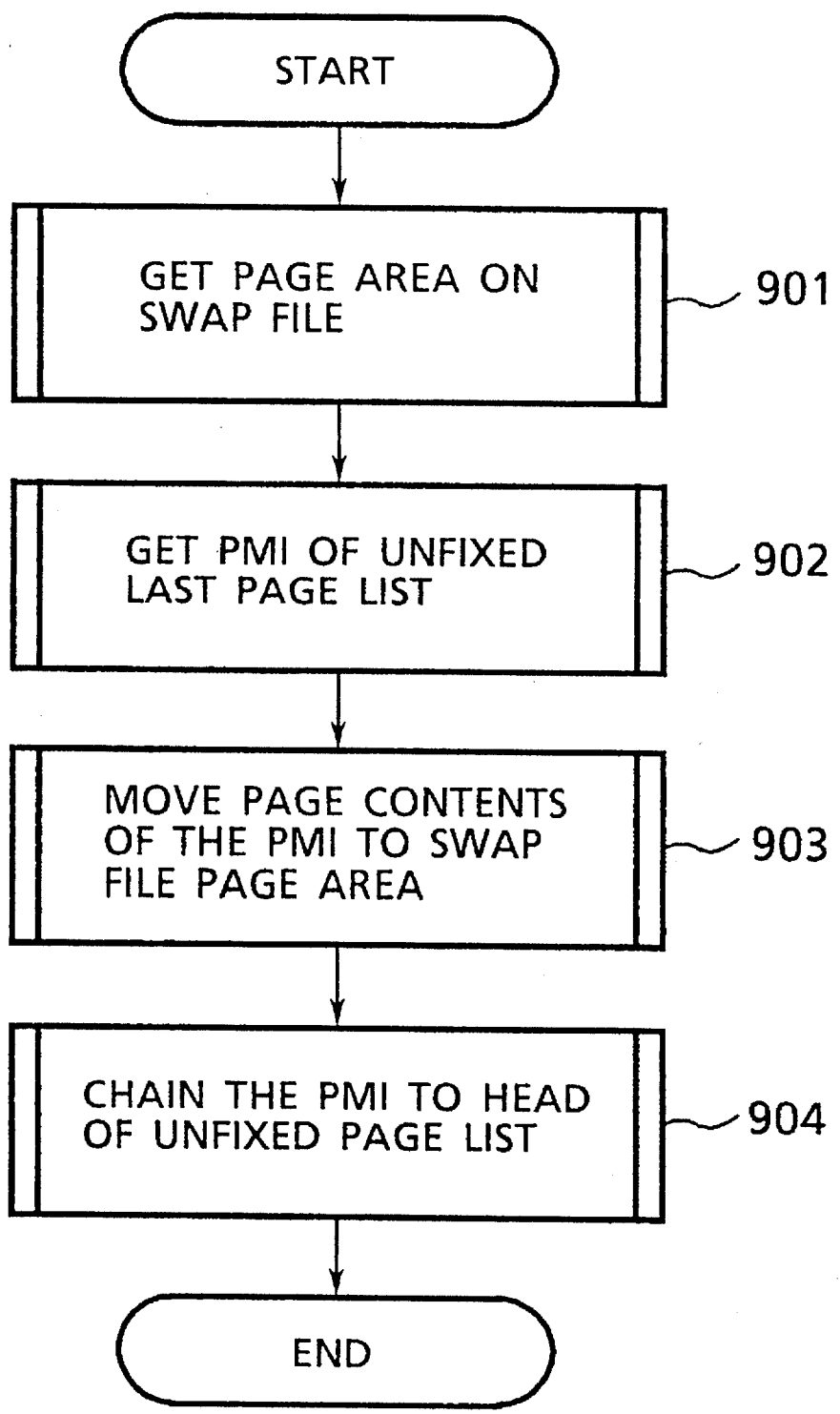
FIG. 9 is a flowchart showing the swap-out process.

FIG. 8 and FIG. 9 show the swap-in operation and swap-out operation, respectively. Swap-in is to load a page from the swap file in the disk memory into the main memory, and swap-out is to save a page from the main memory to the swap file. Both operations deal with unfixed pages. The LUR method is realized by swapping out pages pointed by the unfixed last page list 302 (step 902), and chaining the swapped-in PMI to the head of the unfixed page list 301 (step 904,805, 807).

Figure 10:
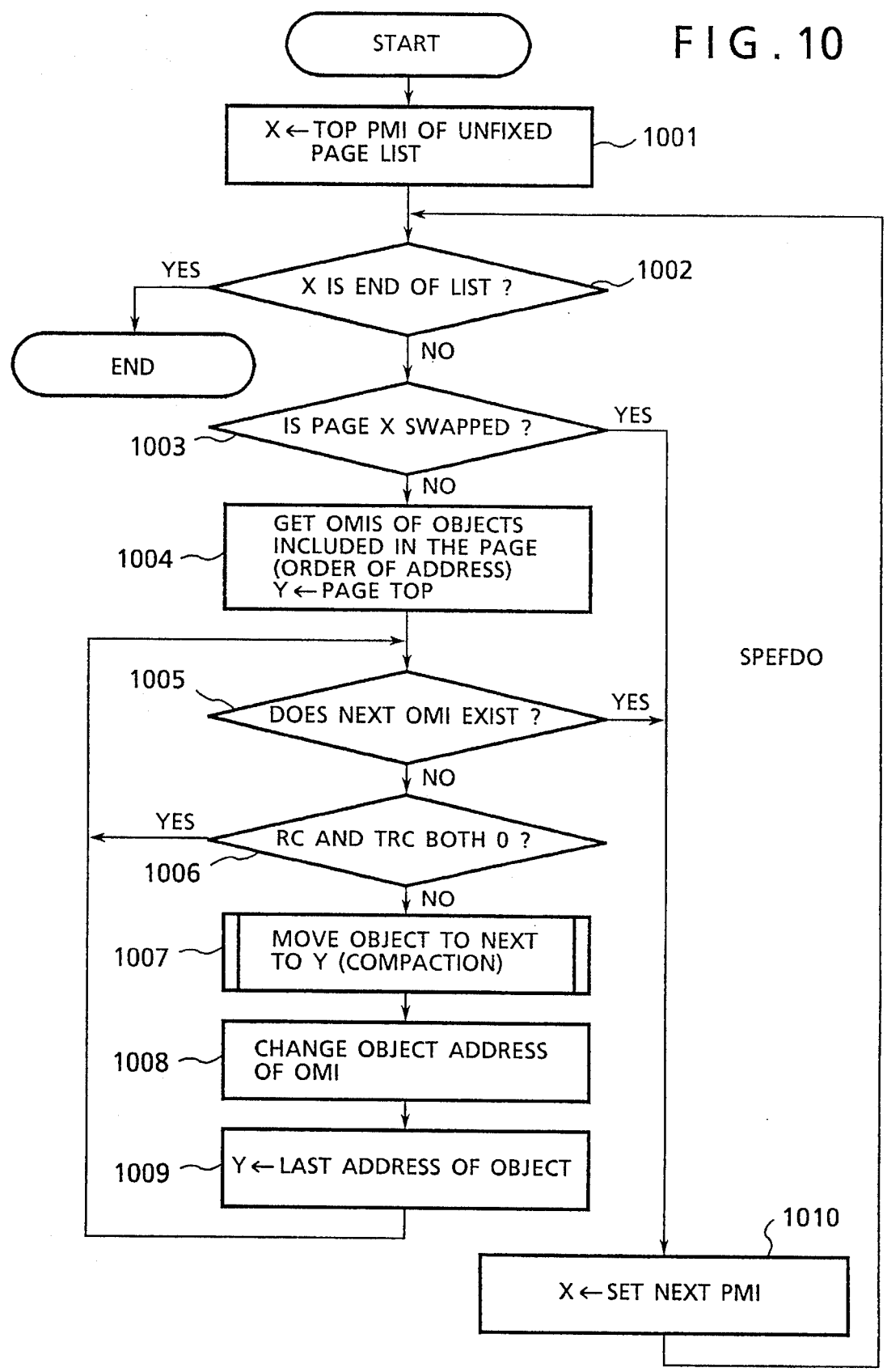
FIG. 10 is a flowchart showing the garbage collection process.

FIG. 10 shows the process of garbage collection. Based on the unfixed page list 301, all unfixed pages are subjected to this process. Among objects existing in each page, any objects which have not been referred or temporarily referred by other objects are assumed to be garbage. Specifically, this is the case when the RC 202 and TRC 203 of the OMI of the object are both zero. Objects having a nonzero value of at least one of RC and TRC are assumed to be active, and active objects existing sparsely in slots of pages are moved to one location (steps 1003–1009). Consequently, inactive objects (garbage) are removed, active objects are compressed, and a continuous unused area is made available.

According to this embodiment, as described above, objects are executed through the reference to the object management information which manages objects and the page management information which implements the page-wise management for the memory space, and address-fixed areas are precluded from the swapping process and garbage collection process, whereby processing of object procedures can be sped up.

According to this invention, an object has its real region address-fixed at the time of execution, and consequently it can be accessed directly without the intervention of the memory management section and accordingly the procedure can be sped up. The real region of an object which is being accessed is precluded from the garbage collection and swapping processes and therefore it is not moved during the execution of procedure, whereby the procedure execution can be sped up.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. An object management system, comprising:

a memory for storing objects each including data and a procedure associated to the data, said memory having its memory space divided into an address-fixed region and an address-unfixed region;

an execution section for fetching an object from said memory and executing the procedure thereof, said execution section placing the object in the address-fixed region at the time of procedure execution and moving the object to the address-unfixed region on completion of execution; and memory management section for managing the used state and unused state of the memory space, and obtaining or releasing the memory area in response to a request, wherein said memory management section implements the page-wise management for the memory space, each page having type information indicative of whether or not said page is address-fixed or address-unfixed, the page type being switched through a manipulation of the information, and wherein each page of the memory space is divided into a plurality of slots, an object being placed in said address-fixed region or address-unfixed region by copying said object to free slots of an address-fixed or address-unfixed page when the size of said object is smaller than the size of the page, or by changing the type of the page where said object resides currently when the object size is greater than the page size.

* * * * *